United States Patent

[11] 3,604,150

| [72] | Inventor | Gerhard Baumann<br>Bumpliz-Bern, Switzerland |
|---|---|---|
| [21] | Appl. No. | 848,946 |
| [22] | Filed | Aug. 11, 1969 |
| [45] | Patented | Sept. 14, 1971 |
| [73] | Assignee | Interhydro A.G.<br>Berne, Switzerland |
| [32] | Priority | Aug. 27, 1968 |
| [33] | | Switzerland |
| [31] | | 12834/68 |

[54] INSET TRAY FOR PLANT CONTAINERS
10 Claims, 3 Drawing Figs.

[52] U.S. Cl. .................................................... 47/34,
  47/38
[51] Int. Cl. ...................................................... A01g 9/02
[50] Field of Search ........................................... 47/34,
  34.13, 1.2, 37, 14, 16, 38, 38.1

[56] References Cited
UNITED STATES PATENTS
1,983,806  12/1934  Norman ........................ 47/34.13

| 2,404,370 | 7/1946 | Fowlkes ........................ | 47/34 |
| 3,028,705 | 4/1962 | Howard ........................ | 47/34.13 |

FOREIGN PATENTS

| 737,660 | 9/1955 | Great Britain ............... | 47/34.13 |
| 1,096,014 | 12/1967 | Great Britain ............... | 47/38.1 |
| 1,098,155 | 1/1968 | Great Britain ............... | 47/38.1 |
| 466,630 | 1/1969 | Switzerland ................. | 47/38.1 |

*Primary Examiner*—Robert E. Bagwill
*Attorney*—Edward T. Connors

ABSTRACT: An insert tray for plant containers, including a liquid-filling tube, and a plate-shaped tray for subdividing the plant container into a lower liquid space and an upper plant-cultivating space, said plate-shaped tray having hollow ribs extending downwardly from the surface of the tray and having openings at their bottom, the improvement of providing a removable liquid-filling tube and a unique shape of the ribs permitting attaching of a plurality of trays in a lesser height than previously required.

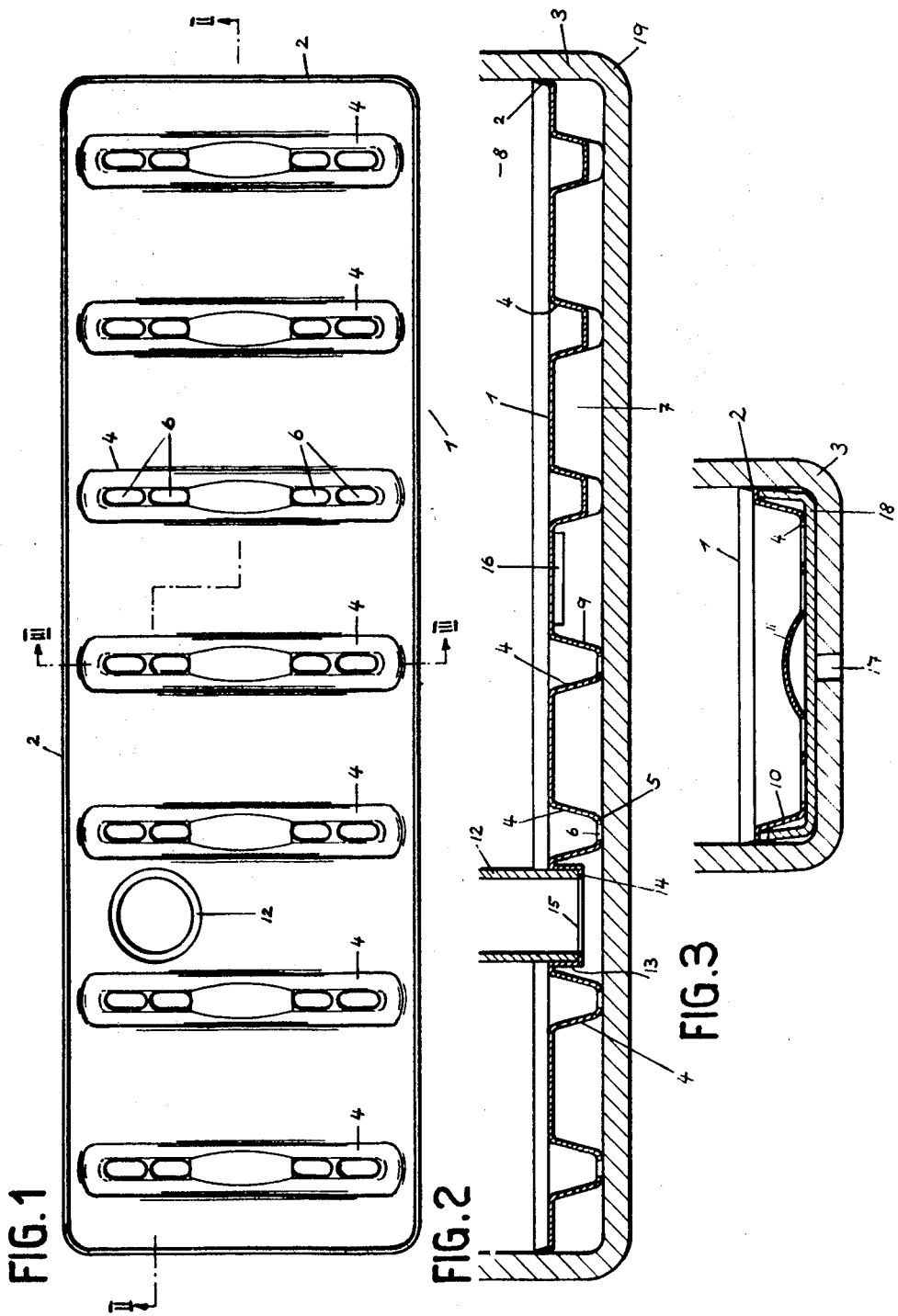

INSET TRAY FOR PLANT CONTAINERS

This invention concerns insert trays for plant containers, including a liquid-filling tube and a plate-shaped tray removable from the container and serving for subdividing the plant container into a lower liquid space and in an upper plant-cultivating space, the plate-shaped tray having hollow ribs for receiving absorbent material, the hollow ribs extending downwardly from the surface of the tray and having openings at their lower ends.

Prior insert devices of this type are, for instance, shown and described in the Swiss Pat. No. 379,827 of the applicant. These prior devices include stud like ribs of such a shape that they prevent the insert devices from being superposed on one another for storing purposes in a large number to piles of relatively low height. Moreover, piling these prior devices on one another is completely impossible because a liquid-filling tube is rigidly connected with the plate-shaped tray, this tube being either formed by a plate in a corner of the plant container or by a semicylindrical, i.e. laterally open tube at an edge of the plate-shaped tray. Furthermore, the length of the few stud-shaped hollow ribs is too short to guarantee a sufficient moistening or irrigation of the soil or earth situated above the tray. Moreover, the prior device is not easy to manufacture, if, e.g. it should be drawn or press moulded from plastics.

It is an aim of this invention to create an insert tray which is easy to manufacture and which has a good storage property even for large quantities at a small space required. The insert tray according to the invention is characterized in that it includes a fitting means with at least one passage opening, said means serving for removably placing a filling tube, and in that both the longitudinal walls and the end walls of the hollow ribs taper from the top towards the bottom.

A further aim of the invention resides in guaranteeing a good watering or irrigation of the soil or earth above the intermediate bottom. For this purpose the hollow ribs preferably extend over the larger portion of the width or the length of the plate-shaped tray and the midportion ribs are preferably vaulted or curved towards the top.

In a further embodiment of the invention the tray is built as a plate able to elastically contact the inside surface of the plant container in order to practically prevent earth from passing from the plant-cultivating space to the liquid space, this feature being especially of advantage in containers with more or less uneven inside surfaces.

In another embodiment of the invention a liquid-collecting trough may be provided, insertable between the bottom of the plant container and the tray.

The drawing illustrates, by way of example, one embodiment of the invention and a modification of this embodiment.

FIG. 1 is a top view of the insert tray.

FIG. 2 is a longitudinal sectional view of the tray and of the lower portion of a plant container taken along the line II—II of FIG. 1, showing also the lower portion of the removably mounted filling tube.

FIG. 3 is a cross-sectional view of the tray and of the lower portion of a plant container taken along the line III—III of FIG. 1, illustrating also in sectional view a liquid-collecting trough disposed beneath the tray.

The oblong plate-shaped tray may be made of flexible material, such as a plastic and has a small wall thickness and a rim 2 extending along its whole circumference. The rim 2 is slightly outwardly inclined towards the top, and elastically contacts the inside wall of the plant container 3 into which the tray 1 can removably be inserted, the rim 2 thus practically preventing earth material from passing from the plant-cultivating space 8 of the container 3 to the liquid space 7. In order to improve, if necessary, the hold between the inside wall of the container 3 and the rim 2, this rim may be slightly fluted. It may also be sufficient that only the rim 2 is elastic.

The tray 1 has hollow ribs 4 parallel to one another and open towards the top and extending in the lateral direction of the bottom 1 over almost the entire width of the same. On planting, the hollow ribs 4 can be filled from the top with absorbent material, such as e.g., peat litter. These ribs 4 not only improve the moisture contents of the earth material in the space 8 but they also increase the stiffness of the tray 1. The bottom 5 of the ribs 4 includes openings 6 for the inlet of liquid (water or nutrient liquid) from the liquid space 7 of the container 3. Both the longitudinal walls 9 and the end walls 10 of the ribs taper towards the bottom, that is, they are inclined from bottom to top towards the outside. This construction not only eases the manufacture in one piece of the tray 1, for instance, by a deep drawing or a pressing process, but also the stacking of many trays 1 one above another, thus allowing the storing of the trays in a small height. Also the rim 2 inclined outwardly towards the top facilitates piling or stacking of the trays. The midportion 11 (FIG. 3) of the bottom 5 of the ribs 4 is vaulted or curved towards the top, whereby a quick and good distribution in the liquid space 7 of the liquid poured in from the tip through tube 12 is guaranteed. Although, according to FIG. 2, the bottoms 5 of the ribs 4 are supported on the bottom of the container 3 consisting, for instance, of a material known under the trademark "Eternit," this support is by no means so tight that the liquid could not enter from the space 7 through the openings 6 into the peat litter in the hollow ribs 4.

Between two adjacent ribs 4 tray 1 is formed with a fitting means 13 made in one piece with the remaining part of the bottom 1, the bottom 14 of this fitting means 13 having one or more openings 15 (such as, for instance, round holes or slots). The unslotted cylindrical filling tub 12 is loosely insertable into and removable from the fitting means 13. In order to store filling tubes 12 of equal length for containers 3 of slightly different height, a series of trays 1 can be manufactured, having differing deep fitting means 13 corresponding to the different heights of the containers. Therefore, cutting to length of filling tubes can be dispensed with, so that the tubes can be stored ready for sale. The smaller the depth of the fitting means 13 with regard to the height of the ribs, the greater the number of trays 1 which can be piled one upon another per unit of length.

The upper side of the tray 1 lies immediately above an overflow 16 of the container 3. Liquid flowing out from this overflow indicates that the uppermost allowable liquid level in the container 3 is reached. The fitting means 13 may also be designed in such a way that the removably mounted filling tube surrounds the collar of the fitting means instead of being inserted into the collar as shown in FIG. 2.

In order that the tray 1 may also be used in already existing plant containers 3 having in their bottom holes 17 closable by rubber plugs or the like, a collecting trough 18 for the liquid can be inserted between the tray 1 and the bottom of the container 3, as is illustrated in FIG. 3. Of course, this collecting trough 18 may also be used in containers 3 having no bottom holes 17. The circumferential shape of the collecting trough 18, which at its upper edge has a cutout (not shown) coinciding with the overflow 16, can be adapted to the contour of the container 3. The trough 18 may, for instance, on its narrow sides have recesses, if the containers 3 have recesses forming handles at 19 (FIG. 2). The collecting trough 18 may also be formed of a plastic material.

The contours of the tray 1 and of the collecting trough 18 may vary with the shape of the containers 3. Also the ribs 4 may extend in another direction, for instance, parallel to one another along the greater portion of the length of the tray 1.

In other embodiments of the invention there may be no elastical rim 2 on the tray. Also in such embodiments a collecting trough 18 may be provided.

I claim:

1. An insert tray for use with a plant container, the tray including a liquid-filling tube and a plate-shaped surface for partitioning said plant container into a lower liquid space and an upper plant cultivating space, said tray including a plurality of hollow ribs for receiving absorbent material, said ribs extending downwardly from said plate-shaped surface and having openings at the lower ends thereof, the improvement including fitting means extending downwardly from said surface of said tray, said fitting means having at least one passage opening and being adapted to removably receive said liquid-filling tube, said ribs formed with longitudinal walls and lower end walls tapering from a larger size at said plate-shaped surface end towards a smaller size at said lower end walls for the easy stacking of a plurality of insert trays.

2. An insert tray as claimed in claim 1 in which said hollow ribs are parallel to one another extending over the greater portion of the lateral direction of said plate-shaped surface.

3. An insert tray as claimed in claim 1 in which said hollow ribs are parallel to one another extending over the greater portion of the longitudinal direction of said plate-shaped surface.

4. An insert tray as claimed in claim 1 in which said hollow ribs positioned towards the center portion of said plate-shaped surface are formed with said end walls located closer towards said plate-shaped surface than said hollow ribs located away from the center portion thereof.

5. An insert tray as claimed in claim 1 in which said fitting means are positioned between two adjacent ribs.

6. An insert tray as claimed in claim 5 in which the depth of said fitting means is less than the depth of said ribs.

7. An insert tray as claimed in claim 1 in which said tray surface includes means adapted to elastically contact the inner wall of said plant container.

8. An insert tray as claimed in claim 1 in which said tray surface includes an elastic rim adapted to elastically contact the inner wall of said plant container.

9. An insert tray as claimed in claim 1 in which said tray surface includes an elastic rim outwardly inclined towards the top, said rim adapted to elastically contact the inner wall of said plant container.

10. An insert as claimed in claim 1 in which is provided a liquid-collecting trough adapted to be removably inserted between said tray and the bottom of said plant container.